United States Patent [19]

Unger

[11] Patent Number: 4,483,583
[45] Date of Patent: Nov. 20, 1984

[54] SELECTIVE DIRECTIONAL COUPLER FOR GUIDED WAVES

[75] Inventor: Hans-Georg Unger, Brunswick, Fed. Rep. of Germany

[73] Assignee: Licentia Patent-Verwaltungs-GmbH, Frankfurt am Main, Fed. Rep. of Germany

[21] Appl. No.: 355,843

[22] Filed: Mar. 8, 1982

[30] Foreign Application Priority Data

Mar. 7, 1981 [DE] Fed. Rep. of Germany ....... 3108742
Mar. 7, 1981 [DE] Fed. Rep. of Germany ... 8106546[U]

[51] Int. Cl.$^3$ .............................................. G02B 5/174
[52] U.S. Cl. .................................. 350/96.15; 333/212; 350/96.12
[58] Field of Search ............... 350/96.12, 96.15, 96.16; 333/208, 209, 210, 212

[56] References Cited

U.S. PATENT DOCUMENTS

| | | | |
|---|---|---|---|
| 3,153,208 | 10/1964 | Riblet | 333/212 |
| 4,026,632 | 5/1977 | Hill et al. | 350/96.15 |
| 4,082,419 | 4/1978 | Thompson et al. | 350/96.12 |
| 4,315,666 | 2/1982 | Hicks, Jr. | 350/96.15 |
| 4,342,499 | 8/1982 | Hicks, Jr. | 350/96.15 |

FOREIGN PATENT DOCUMENTS 53-137160 11/1978 Japan ................. 350/96.15

OTHER PUBLICATIONS

Southworth, "Principles and Applications of Waveguide Transmission", D. Van Nostrand Company, Inc., 1956, pp. 347-353.
Marcuvitz, "Waveguide Handbook", MIT Radiation Laboratory Series, McGraw-Hill, 1951, pp. 373-386.

Primary Examiner—John D. Lee
Attorney, Agent, or Firm—Spencer & Frank

[57] ABSTRACT

In a selective directional coupler composed of two outer waveguides, the outer waveguides are coupled together by an intermediate waveguide disposed between the two outer waveguides, the intermediate guide being constructed and positioned such that at a selected coupling frequency its coupling mode is in phase synchronism with the transmission modes in the two outer waveguides.

20 Claims, 8 Drawing Figures

SELECTIVE DIRECTIONAL COUPLER FOR GUIDED WAVES

BACKGROUND OF THE INVENTION

The present invention relates to selective directional couplers of the type composed of two preferably parallel waveguides which are to be coupled together.

Directional couplers whose coupling degree depends on the frequency or wavelength of the electromagnetic oscillations to be coupled out are required, for example, for carrier frequency data transmission of several channels in frequency multiplex in one and the same transmission medium. A typical application is two-way voice operation with optical signals on a glass fiber employing wavelength multiplexing. In this case, as well as in other applications with lower carrier frequencies transmission in one direction takes place at a different light wavelength than in the opposite direction. At the end points of such a fiber path, or at the repeaters, transmission takes place, as shown in FIG. 1 hereof, through a selective directional coupler at a wavelength $\lambda_0$ and reception occurs from the opposite direction at another wavelength $\lambda_e$.

The selectivity of the directional coupler is such that the entire transmitting power at $\lambda_0$ is fed into the fiber connection and the entire incoming power at $\lambda_e$ reaches the receiver. The selectivity of the directional coupler, supported by its directional effect, moreover reduces near-end crosstalk, so that even with high transmitting power only a disappearingly small portion of the transmitted power reaches the associated receiver.

As a further advantage of such a transmitting-receiving duplexer, the fundamental mode received from the fiber connection, which for this application is a single mode fiber, can have any desired polarization since it passes through the selective directional coupler without coupling.

SUMMARY OF THE INVENTION

It is an object of the present invention to simplify the structure of a selective directional coupler of the above described type which can be realized in a simple manner.

The above and other objects are achieved, according to the present invention, in a selective directional coupler composed of two outer waveguides, by the provision of means for coupling the waveguides together composed of an intermediate waveguide disposed between the two waveguides, the intermediate guide being constructed and positioned such that at a selected coupling frequency its coupling mode is in phase synchronism with the transmission modes in the two outer waveguides.

DESCRIPTION OF THE PREFERRED EMBODIMENTS

Figure 1:
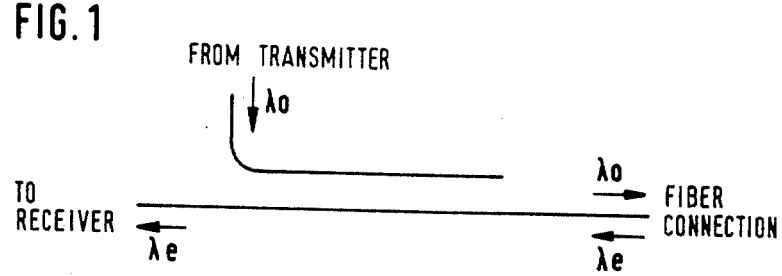
FIG. 1 is a pictorial diagram of the basic elements of a directional coupler.
Figure 2:
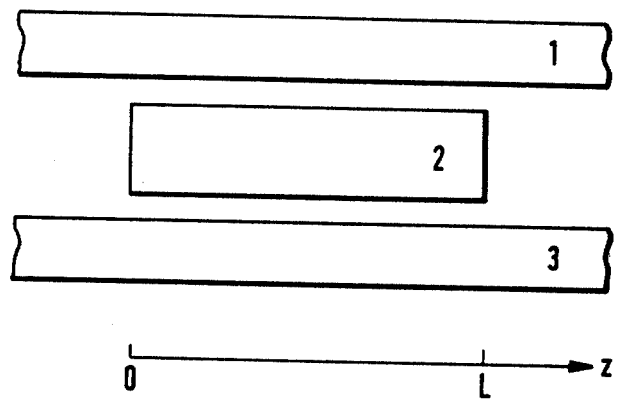
FIG. 2 is a plan view of a basic embodiment of a coupler according to the invention.

The basic structure of a selective directional coupler according to the invention for such and similar applications is shown in FIG. 2. Two continuous waveguides 1 and 3 of known structure are coupled together via a waveguide section 2 disposed therebetween and extending along the transmission path z from z=0 to z=L.

The continuous waveguides 1 and 3 may have identical cross sections. For the purpose of calculation, it is here assumed that the modes in waveguides 1 and 3 which are to be selectively coupled together have the same phase constants $\beta_1 = \beta_3 = \beta$. In practice, this requirement need be met only for that frequency $f_0$, corresponding to the wavelength $\lambda_0$, at which the selective coupler is to couple all of the power from one waveguide to the other.

Coupling of the modes between waveguides 1 and 3 is effected via one of the modes carried by the intermediate waveguide 2. For the purpose of calculation, it is here assumed that the mode in waveguide 1 couples with the mode in waveguide 2 just as strongly as the mode in waveguide 3 couples with the mode in waveguide 2. In practice, this requirement again need be met only for the frequency $f_0$, or the wavelength $\lambda_0$, respectively.

Based on above conditions, and if losses in the coupler can be neglected, the following system of coupled differential equations applies for the amplitudes $A_1$, $A_2$ and $A_3$ of these modes; normalized with respect to modal power $$\frac{dA_1}{dz} = -j\beta A_1 - jcA_2$$

$$\frac{dA_2}{dz} = -jcA_1 - j\beta_2 A_2 - jcA_3$$

$$\frac{dA_3}{dz} = -jcA_2 - j\beta A_3$$

where $\beta_2$ is the phase constant of the coupling mode in the intermediate waveguide 2, and c is the coupling coefficient for the coupling modes in waveguides 1 and 3 with that of the intermediate waveguide.

The system of three coupled modes has three natural waves, which travel independently of one another along the coupling path. Their phase constants are respectively: $\beta$; $\beta + \delta + \sqrt{\delta^2 + 2c^2}$; and $\beta + \delta - \sqrt{\delta^2 + 2c^2}$, where $\delta = (\beta - \beta_2)/2$ is half the difference between the phase constant of the modes in guides 1 and 3 and of the coupling mode in guide 2.

In the general solution for the amplitudes of the modes in guides 1, 2 and 3, the natural waves are superposed as follows:

$$A_1 = -w_1 e^{-j\beta z} + w_2 e^{-j(\beta + \delta + \sqrt{\delta^2 + 2c^2})z} + w_3 e^{-j(\beta + \delta - \sqrt{\delta^2 + 2c^2})z},$$

$$A_2 = \frac{\delta + \sqrt{\delta^2 + 2c^2}}{c} w_2 e^{-j(\beta + \delta + \sqrt{\delta^2 + 2c^2})z} + \frac{\sqrt{\delta^2 + 2c^2} - \delta}{c} w_3 e^{-j(\beta + \delta - \sqrt{\delta^2 + 2c^2})z},$$

-continued $$A_3 = w_1 e^{-j\beta z} + w_2 e^{-j(\beta+\delta+\sqrt{\delta^2+2c^2})z} + w_3 e^{-j(\beta+\delta-\sqrt{\delta^2+2c^2})z},$$

where $w_i (i=1,2,3)$ is the peak amplitude of the i-th natural wave.

If only the input of waveguide 1 is excited at $z=0$, the starting conditions are $A_1 = 1$ and $A_2 = A_3 = 0$ at $z=0$. With such excitation the amplitudes of the energy of modes in guides 1 and 3 have the following absolute values, or magnitudes, along the coupler:

$$|A_1| = \tfrac{1}{2} \left| 1 + e^{-j\delta z} \left( \cos\sqrt{\delta^2 + 2c^2}\, z + \frac{j\delta}{\sqrt{\delta^2 + 2c^2}} \sin\sqrt{\delta^2 + 2c^2}\, z \right) \right| \quad (1)$$

$$|A_3| = \tfrac{1}{2} \left| 1 - e^{-j\delta z} \left( \cos\sqrt{\delta^2 + 2c^2}\, z + \frac{j\delta}{\sqrt{\delta^2 + 2c^2}} \sin\sqrt{\delta^2 + 2c^2}\, z \right) \right|$$

Two borderline cases are of particular interest for practical application:

1. $\beta_2 = \beta$:

The coupling mode in guide 2 has the same phase constant as the two modes in guides 1 and 3. In this case $\delta = 0$ and the amplitude absolute values are:

$$|A_1| = \tfrac{1}{2} |1 + \cos(\sqrt{2}\, cz)|$$

$$|A_3| = \tfrac{1}{2} |1 - \cos(\sqrt{2}\, cz)|.$$

With a phase synchronous coupling mode in guide 2 the power thus swings back and forth between the guides 1 and 3 along the coupling path.

At the points:

$$z = (2m + 1)\pi/(\sqrt{2}\, c), \text{ where } m = 0, 1, 2 \ldots,$$

it is carried completely by guide 3 and at the points:

$$z = 2m\pi/(\sqrt{2}\, c) \text{ with } m = 0,1,2 \ldots$$

it is carried completely by guide 1. For full power transfer from guide 1 to guide 3 the coupler is best given a length of $$L = \pi/(\sqrt{2}\, c) \quad (2)$$

2. $|\delta| \gg c$:

Full power conversion from guide 1 to guide 3 is possible only for $\delta = 0$, i.e. with a phase synchronous coupling mode. For $\delta \neq 0$ only part of the input power from guide 1 is coupled to guide 3. In the second borderline case, $|\delta| \gg c$, only a very small amount of power is coupled. Under this condition, the amplitude absolute values result, in approximation from equations (1), as follows:

$$|A_1| \simeq 1 - j\frac{c^2}{2\delta^2} \sin \delta z\, e^{-j\delta z}$$

$$|A_3| \simeq \frac{c^2}{2\delta^2} \sin \delta z$$

According to these approximations, at most $c^4/(4\delta^4)$ of the input power is coupled to guide 3; the remainder remains mainly in guide 1, a small portion remains in the coupling section 2. From guide 1 at most $c^2/\delta^2$ of its input power is lost under this condition.

In order to now realize the desired selectivity, i.e. full power transfer at a frequency $f_0$, or wavelength $\lambda_0$, respectively, and the least possible power transfer at certain frequencies remote therefrom, the intermediate waveguide section 2 should be selected whose coupling mode is phase synchronous with the modes of guides 1 and 3 at $f = f_0$, but has a sufficient phase difference at the blocking frequencies to there meet the condition:

$$|\delta| \gg c.$$

Figure 3:
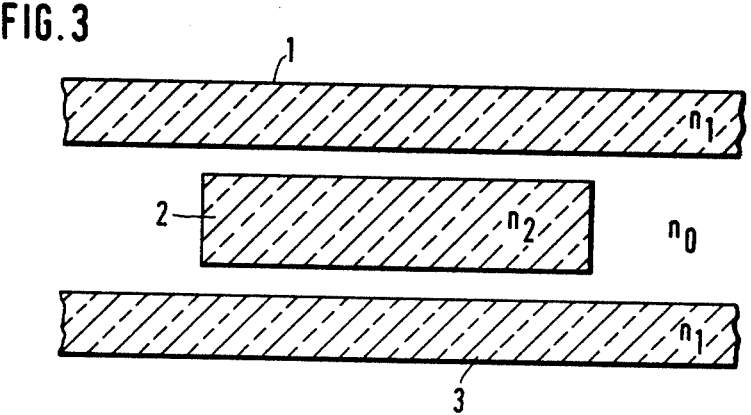
FIG. 3 is a cross-sectional plan view of a coupler similar to that of FIG. 2.

For light frequencies, all these requirements can be met with dielectric films or strips as waveguides. These optical film or strip waveguides are embedded, for example as shown in FIG. 3, in a transparent substance having an index of refraction $n_0$. In the embodiment of FIG. 3, the waveguides 1 and 3 have identical cross sections and the same index of refraction $n_1 > n_0$. The intermediate waveguide 2 has a larger index of refraction $n_2 > n_1$ and, depending on the requirement for selectivity, its cross section should also be greater than the cross section of each of waveguides 1 and 3.

Figure 4:
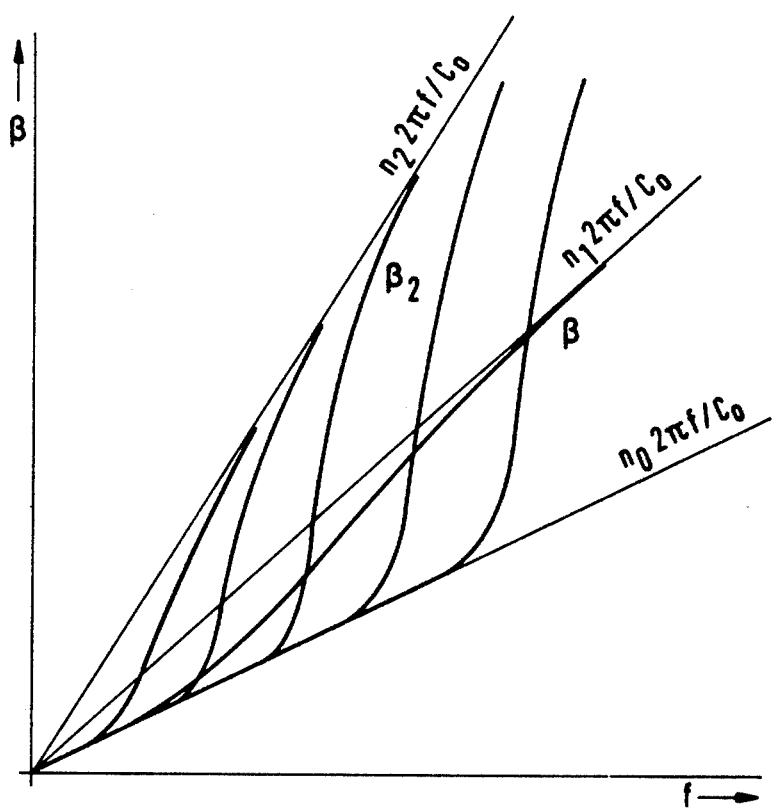
FIG. 4 is a phase constant vs. frequency diagram illustrating the construction and operation of a coupler according to the invention.

FIG. 4 presents a dispersion diagram which depicts the phase constant $\beta$ of the fundamental mode in the waveguides 1 and 2 and the phase constants $\beta_2$ of modes in the intermediate waveguide which may serve as coupling modes, as a function of frequency. All phase constant curves have their origins at the respective limit frequency on line $n_0 2\pi f/c_0$, where $c_0$ is the speed of light in vacuo. For high frequencies, each curve approaches asymptotically the wave number of the respective waveguide material. Aside from the phase curve of the fundamental mode of the intermediate waveguide 2, the phase curves of all higher modes of this waveguide intersect the phase constant curve of the fundamental mode in waveguides 1 and 3, the latter approaching asymptotically the line $n_1 2\pi f/c_0$. Therefore, they all can serve as coupling modes between the fundamental modes in waveguides 1 and 3. At the intersection frequencies with the fundamental mode phase constant curve of waveguides 1 and 3 they provide full power transfer between the fundamental modes in guides 1 and 3.

Which mode is selected as the coupling mode, and how the waveguides 1 and 3 and the intermediate waveguide 2 are designed, depends on the values of the frequencies which are to be coupled or are to remain decoupled, respectively. If these frequencies differ by a large amount, a coupling mode of lower order is selected; for a small difference between frequencies, requiring a correspondingly higher selectivity, a coupling mode of higher order will be selected. Selectivity can also be increased by increasing the index of refraction in the intermediate waveguide 2 and by enlarging its cross section. Then the phase constant curves of the coupling modes in the intermediate waveguide 2 intersect the phase constant curve of the fundamental mode in waveguides 1 and 3 at an increasingly larger angle. The phase difference between these modes then increases more rapidly beginning with $\delta=0$ at the point of intersection of the curves, with increasing deviation of the frequency from the intersection frequency.

Figure 5:
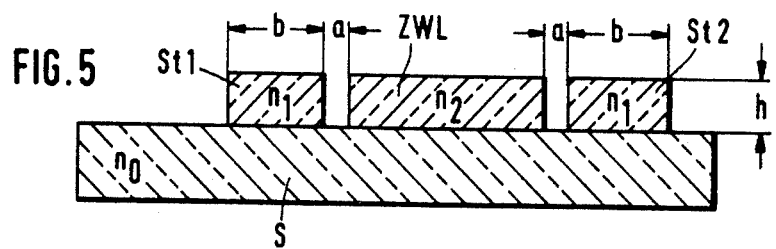
FIGS. 5–8 are cross-sectional views of preferred embodiments of the coupler according to the invention.

With the aid of the example of a selective directional coupler made of dielectric strips which are placed, as shown in FIG. 5, on a dielectric substrate S, it will be shown which dimensions should be selected with respect to the wavelength $\lambda$ of the lightwaves or microwaves, respectively. A simple directional coupler can consist of two parallel strips St1 and St2 mounted on a substrate S. Each strip has a width $b=3.5\lambda$, a height $h=1.75\lambda$, and an index of refraction $n_1=1.5$. The strips are spaced apart by a distance $a=b$. The substrate S has an index of refraction $n_0=n_1/1.1$ and couples the fundamental modes of the strips with the coupling coefficient $c=0.002\lambda$.

If the same strips on the same substrate are selected for a selective directional coupler according to the invention and a further strip ZWL two to four times the width b and with an index of refraction $n_2$ somewhat greater than $n_1$ is used for the intermediate waveguide, the same coupling coefficient can be set for coupling the fundamental modes in the outer strips via a phase synchronous coupling mode in the intermediate waveguide when the distance, a, between the strips is selected somewhat smaller than $a=b$. Condition (2) is met if L, the length of strip ZWL in direction z, $=1110\lambda$. For light wavelengths this is of the order of magnitude of one millimeter.

In order to be able to use even shorter couplers in integrated optical systems, the strips must be moved even closer together. Because the coupling coefficient depends exponentially upon the distance between the strips, even a slight decrease in the distance suffices to permit drastic shortening of the coupler.

The substrate and the films or strips of a selective directional coupler for optical frequencies may be produced from quartz glass or other silicate glasses. In order to increase the index of refraction of the films or strips with respect to the index of refraction of the substrate and particularly in order to realize a higher index of refraction in the intermediate waveguide than in the two outer waveguides, the quartz glass may be doped with germanium oxide or phosphorus oxide. An exemplary value for such a doping is 15% molar concentration of $GeO_2$ in $SiO_2$ in order to raise the refractive index by nearly 1%.

Even greater differences in the indices of refraction are realized if, for example, a substrate glass with a low index of refraction is employed, the outer waveguides (1 and 3) are made of a transparent polymer, such as, for example, polyurethane, and the intermediate waveguide (2) is made of zinc sulfide. For such selective directional couplers which are to operate at optical frequencies, many different materials can be employed. However, care must always be taken that they are sufficiently transparent to the light wavelengths to be transmitted so as to keep coupling losses low.

The form of the waveguides between which electromagnetic wave energy is to be selectively converted as well as the form of the intermediate waveguide is by no means limited to simple films or strips in or on substrates; rib or ridge waveguides as well as strip loaded film waveguides can also be used.

Figure 6:
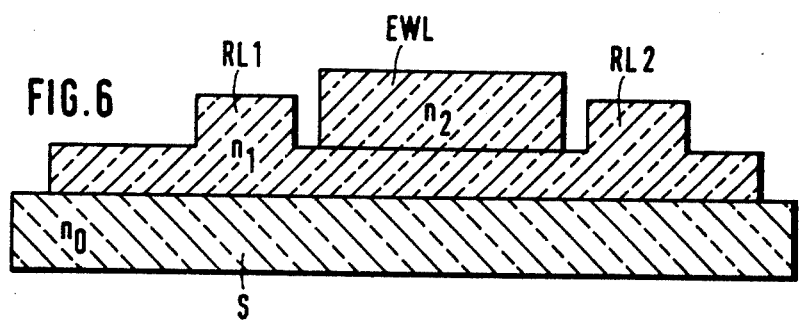

FIG. 6 shows, as a representative example only, a cross-sectional view of a selective directional coupler according to the invention, particularly for optical frequencies, in which the two outer waveguides are rib waveguides RL1 and RL2 and a strip loaded film waveguide EWL serves as the intermediate waveguide. The base of the intermediate waveguide is formed by a dielectric film which is integral with the outer rib waveguides. The index of refraction $n_1$ of the film and rib waveguides must be somewhat higher than the index of refraction $n_0$ of the substrate S and the intermediate waveguide EWL should have an index of refraction $n_2$ which is even higher than $n_1$.

Figure 7:
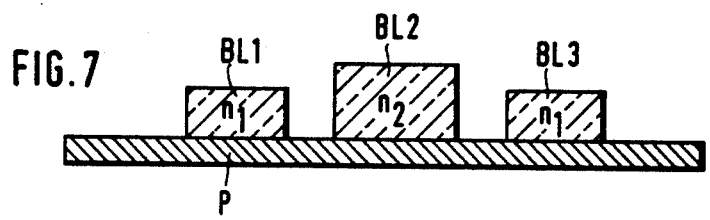

Selective directional couplers for microwaves can also be constructed of dielectric strip waveguides, particularly if millimeter waves are involved because in that case the dielectric strips still have a relatively small cross section. However, dielectric image guides and hollow waveguides can also be used for this purpose. FIG. 7 is a cross-sectional view of a selective directional coupler employing image guides. Its three image guides BL1, BL2 and BL3 are parallel to one another on a common metal plate P. The two outer image guides BL1 and BL3 have the same cross-sectional dimensions and the same index of refraction $n_1$, while the inner image guide BL2, serving as the intermediate waveguide, has a larger cross section and also an index of refraction $n_2$ which is higher than $n_1$.

Figure 8:
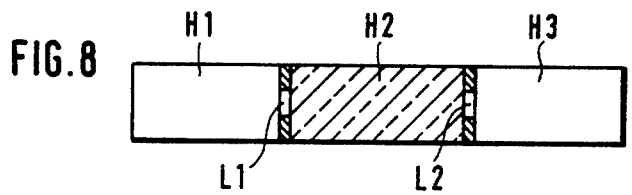

FIG. 8 is a cross-sectional view of a selective directional coupler according to the invention composed of hollow rectangular waveguides H1, H2 and H3. The intermediate waveguide H2 is coupled with the outer waveguides H1 and H3, for example, by rows of holes L1 and L2 in the common partitions between adjacent waveguides. The intermediate waveguide H2 has a larger cross section than the outer waveguides, in that H2 is wider than H1 or H3, or is partially or completely filled with a dielectric material. In the embodiment shown in FIG. 8, both measures, i.e. a broader cross section for waveguide H2 than for the outer waveguides as well as filling with a dielectric material, are provided for the intermediate waveguide H2. These two measures support one another in their effect to increase selectivity.

The waveguide sections shown in FIGS. 5, 6 and 7 do not need any cladding layers around the dielectric material for operation according to the invention. The region above the dielectric material should rather be air or vacuum. Any housing for protection and handling could be placed directly below the substrates S in FIGS. 5 and 6 or the metallic ground plane P in FIG. 7. Sideways from the dielectric material and above it any housing should however have sufficient distance in order not to interfere with the evanescent fields of the waves on the dielectric material. These distances must be in the range of the cross-sectional dimensions of the waveguides or larger.

When the waveguide sections in FIGS. 5 and 6 are to be used for microwaves a metallic ground plane directly below their substrates S can improve their performance and give more mechanical strength to the structures.

The waveguide section in FIG. 6 should consist of the same or similar dielectric materials as that in FIG. 5 and as described above. Its dimensions are comparable to those disclosed relative to FIG. 5. When designed for and applied to the transmission of light waves exemplary values for the wavelengths are $\lambda_o=1.3$ μm where the material dispersion of silica fibres is minimal and $\lambda_e=1.5$ where silica fibres can have the lowest transmission loss.

In this example the selective coupler at the other end of a two-way transmission system would of course have $\lambda_o=1.5$ μm and $\lambda_e=1.3$ μm.

In millimeter-wave applications of the waveguide section in FIGS. 5, 6 and 7 their cross-sectional dimensions are correspondingly larger. Exemplary values for the wavelength for $\lambda_o$ and $\lambda_e$ are near 4 mm or near 8 mm where for radio transmission the atmosphere has transmission windows.

For still lower frequencies of the microwave spectrum the structure in FIG. 8 will usually be preferred with exemplary values of $\lambda_o$ and $\lambda_e$ in the range of 2 to 10 cm.

It will be understood that the above description of the present invention is susceptible to various modifications, changes and adaptations, and the same are intended to be comprehended within the meaning and range of equivalents of the appended claims.

What is claimed is:

1. In a selective directional coupler composed of two outer waveguides, the improvement comprising means for coupling said waveguides together composed of an intermediate waveguide disposed between said two outer waveguides, said intermediate guide being constructed to have a cross section which is unvarying along its length and positioned such that at a selected coupling frequency only one mode of said intermediate waveguide, constituting a coupling mode, is in phase synchronism with the transmission modes in said two outer waveguides.

2. Directional coupler as defined in claim 1 wherein said two outer waveguides are each coupled only to said intermediate waveguide.

3. Directional coupler as defined in claim 1 or 2 wherein said two outer waveguides are constituted by dielectric films and said intermediate waveguide is constituted by a further dielectric film disposed between said films constituting said outer waveguides.

4. Directional coupler as defined in claim 1 or 2 wherein said two outer waveguides are dielectric strip conductors, and said intermediate waveguide is constituted by a dielectric film.

5. Directional coupler as defined in claim 1 or 2 wherein each of said waveguides is constituted by a respective strip of dielectric material.

6. Directional coupler as defined in claim 5 further comprising a substrate of dielectric material on which said strips are mounted and having a lower index of refraction than said strips.

7. Directional coupler as defined in claim 6 wherein the index of refraction of at least one said material is variable.

8. Directional coupler as defined in claim 5 further comprising a substrate of dielectric material in which said strips are embedded and having a lower index of refraction than said strips.

9. Directional coupler as defined in claim 8 wherein the index of refraction of at least one said material is variable.

10. Directional coupler as defined in claim 1 wherein said outer waveguides comprise ribs of dielectric material on a film of dielectric material, and said intermediate waveguide comprises a rib of dielectric material on a film of dielectric material.

11. Directional coupler as defined in claim 10 further comprising a substrate of dielectirc material on which said film associated with said outer waveguides is mounted and having a lower index of refraction than said waveguides.

12. Directional coupler as defined in claim 10 or 11 wherein the index of refraction of at least one said material is variable.

13. Directional coupler as defined in claim 1 further comprising a dielectric film, and wherein said two outer waveguides are constituted by ribs on said dielectric film and said intermediate waveguide is constituted by a strip forming a strip loaded film waveguide mounted on said film.

14. Directional coupler as defined in claim 13 wherein said outer waveguides are dielectric ribs, and further comprising a dielectric substrate on which said waveguides are supported via said film and having a lower index of refraction than said waveguides or said film.

15. Directional coupler as defined in claim 1 wherein each said waveguide is an image line, and further comprising a metal plate on which said waveguides are mounted.

16. Directional coupler as defined in claim 1 or 2 wherein the coupling distance between each said outer waveguide and said intermediate waveguide is variable.

17. Directional coupler as defined in claim 1 wherein each said waveguide is a hollow waveguide, and further comprising two partitions each interposed between said intermediate waveguide and a respective outer waveguide and provided with a row of holes via which said respective outer waveguide is coupled to said intermediate waveguide.

18. Directional coupler as defined in claim 17 wherein each said waveguide is a rectangular waveguide.

19. Directional coupler as defined in claim 17 or 18 further comprising a dielectric insert at least partially filling the cross section of said intermediate waveguide and extending along the entire length of said coupler.

20. Directional coupler as defined in claim 1, 2, 10, 11, 13, 14, 15, 17 or 18 wherein said outer waveguides extend parallel to one another.

* * * * *